United States Patent
Tatourian et al.

(10) Patent No.: US 9,544,318 B2
(45) Date of Patent: Jan. 10, 2017

(54) HTML SECURITY GATEWAY

(71) Applicant: McAfee, Inc., Santa Clara, CA (US)

(72) Inventors: Igor Tatourian, San Jose, CA (US); Greeshma Yellareddy, San Francisco, CA (US); Norman Yee, Folsom, CA (US); Sudip S. Chahal, Gold River, CA (US); Hong C. Li, El Dorado Hills, CA (US); Tobias M. Kohlenberg, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/580,996

(22) Filed: Dec. 23, 2014

(65) Prior Publication Data

US 2016/0182537 A1 Jun. 23, 2016

(51) Int. Cl.
*H04L 29/06* (2006.01)

(52) U.S. Cl.
CPC ....... *H04L 63/1416* (2013.01); *H04L 63/1441* (2013.01)

(58) Field of Classification Search
CPC .......................... H04L 63/1416; H04L 63/1441
USPC ........................................................... 726/23
See application file for complete search history.

(56) References Cited

U.S. PATENT DOCUMENTS

| | | | | |
|---|---|---|---|---|
| 7,568,107 B1* | 7/2009 | Rathi | ...... | G06F 21/41 713/182 |
| 8,041,036 B1* | 10/2011 | Gerber | ...... | G06F 21/6263 380/259 |
| 8,055,241 B2* | 11/2011 | Zhao | ...... | H04L 12/585 455/410 |
| 8,505,094 B1* | 8/2013 | Xuewen | ...... | H04L 63/1416 707/687 |
| 8,819,049 B1* | 8/2014 | Yeo | ...... | H04L 63/1483 707/765 |
| 8,893,294 B1* | 11/2014 | Steele, III | ...... | G06F 17/30902 715/234 |
| 2009/0064337 A1* | 3/2009 | Chien | ...... | G06F 21/564 726/25 |
| 2012/0324568 A1* | 12/2012 | Wyatt | ...... | G06F 21/51 726/13 |
| 2014/0283078 A1* | 9/2014 | Redfoot | ...... | H04L 63/1441 726/24 |
| 2015/0020204 A1* | 1/2015 | Wang | ...... | H04L 63/1416 726/25 |
| 2015/0101052 A1* | 4/2015 | Ledenev | ...... | G06F 21/566 726/24 |
| 2015/0207816 A1* | 7/2015 | Zhou | ...... | H04L 67/42 726/23 |
| 2015/0358342 A1* | 12/2015 | Zhang | ...... | G06F 21/51 726/23 |

(Continued)

*Primary Examiner* — Michael S McNally
(74) *Attorney, Agent, or Firm* — Blank Rome LLP (57) ABSTRACT

A technique allows a client computing system with a web browser to receive a web page in response to transmitting a request for content. The web page may include active content, html data and cascading style sheets (CSS). In embodiments, a gateway device may rewrite the web page dynamically by rewriting node identifiers and class names, removing and separating client-side scripts from html data and CSS data, and blocking or disabling execution of the client-side scripts if these scripts contain vulnerable code. A web page may be rewritten based on analysis information provided by a third-party or analyzed at the gateway device.

25 Claims, 7 Drawing Sheets

(56) References Cited

U.S. PATENT DOCUMENTS

2015/0373034 A1* 12/2015 Seshadri ............. H04L 63/1416
726/22
2016/0094575 A1* 3/2016 Shekyan ............. G06F 17/3089
726/25

* cited by examiner

HTML SECURITY GATEWAY

TECHNICAL FIELD

Embodiments described herein generally relate to client and server network traffic, and more particularly to dynamically removing and separating active content from html and style sheets in a web page and blocking execution of known exploitable code in the active content at a client web browser.

BACKGROUND ART

Today, when a user or client machine, e.g., a computer or a mobile device, requests a webpage on the Internet via a web browser, e.g., a resource name through a Hypertext Transfer Protocol (HTTP) GET command to a web server, content is sent from the web server or other location on the Internet and is rendered at the web browser. Content can include both executable content and non-executable content that may be embedded in web pages that are received over the Internet. Executable content, including forms or other dynamic client-side scripts (e.g. inline scripts in JavaScript® scripting language or Asynchronous Javascript and XML (AJAX)) while non-executable content may include hypertext markup tags in HyperText Markup Language 5 (HTML5) and Cascading Style Sheets (CSS) (JAVASCRIPT is a registered trademark of Oracle Corporation). JavaScript instructions that are embedded in web pages may be executed by a web browser when the web page is selected. As more and more users are interconnected over the Internet, computer security becomes increasingly more important as web pages may include malicious software (malware) that are inserted enroute to a user. In some cases, a user may forego security measures from certain websites and implicitly trust that the content being delivered will not harm the user's machine. However, third-parties can circumvent web server security and insert bad content or manipulate active content in web pages during transit from trusted web domains to the user. For example content that has the potential to steal information from the user machine may be inserted through cross-site scripting via a gateway or man-in-the middle (MITM) injection by using malicious internet bots that masquerade as a user (by trying to login) or that masquerade as user input (by changing user input clicks and input fields). The malicious internet bots may detect user input fields by using element identifiers or element classes in the HTML web page.

Prior art solutions for defending against script injection in HTML web pages have addressed rejecting bad data characters, limiting information in server responses, enforcing response lengths, limiting permissions in web browsers, or detecting bad scripts and blocking their execution or blocking execution of all scripts in a web browser. However, these solutions are not completely effective. For example, rejecting bad data requires that a web browser know all variations of malicious inputs in the data. However, an attacker may only need to find one vulnerability in a website or browser code in order to exploit this vulnerability. Additionally, limiting information in server responses such as blocking script execution or limiting permissions in web browsers may impact a user's experience online. A way of providing web browser security for preventing exploitable or malware injected content in HTML web pages from executing at a web browser on a user client would be desirable.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, scareware and any other type of malicious programs.

A technique allows a client computing system with a web browser to receive a HTML web page in response to transmitting a request for content. The web page may include active content, html data and cascading style sheets (CSS). In embodiments, a gateway device may rewrite the web page dynamically by rewriting node identifiers and class names, removing and separating client-side scripts from HTML data and CSS data, and blocking or disabling execution of the client-side scripts if these scripts contain vulnerable code. Other embodiments may include renaming function and variables in scripts and performing a code analysis to determine vulnerable code and replacing vulnerable code with trusted code from a third-party library.

Figure 1:
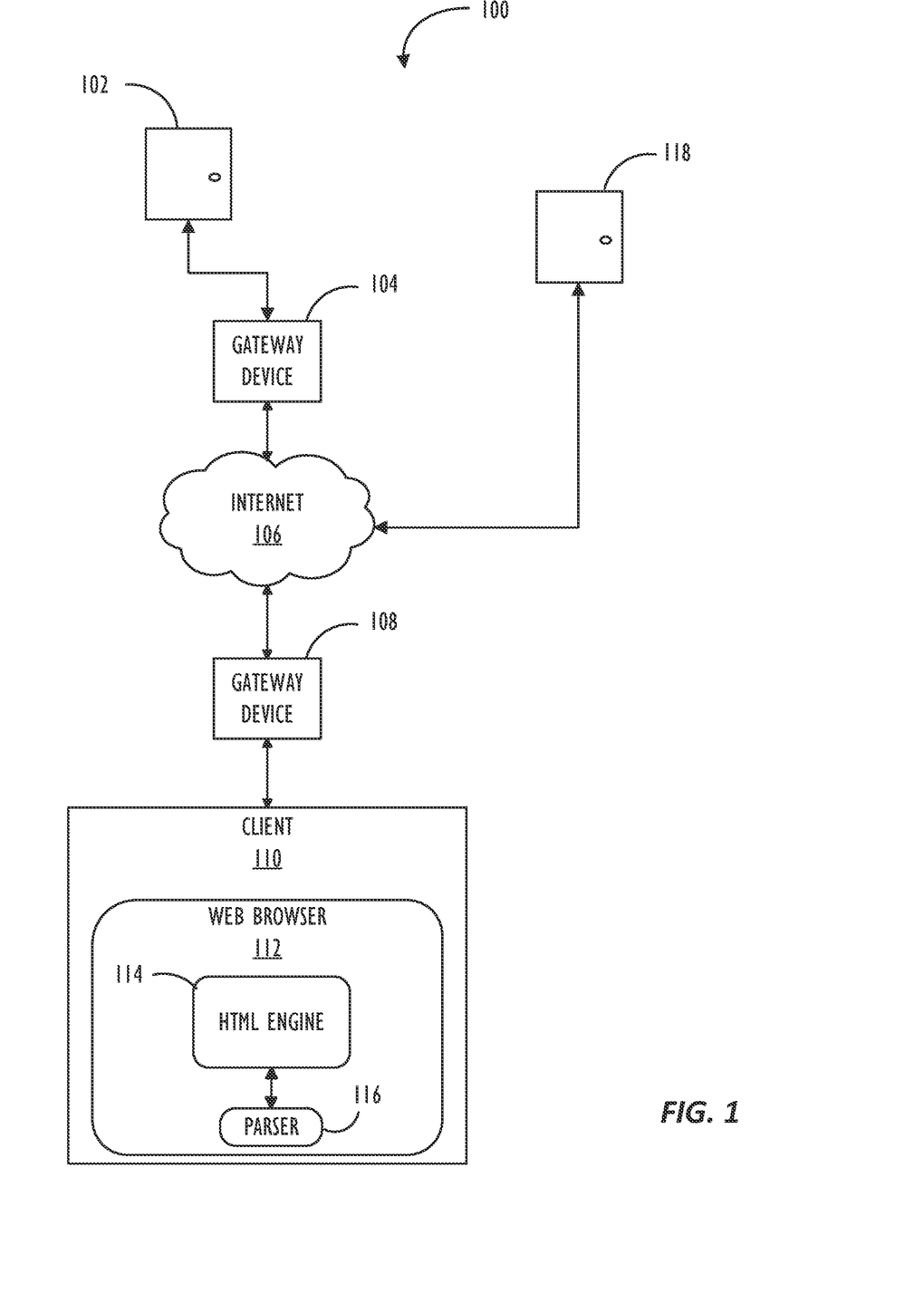
FIG. 1 is a diagram illustrating a system for performing HTML security of web pages according to one embodiment.

Referring to the figures, FIG. 1 illustrates a system 100 for providing security of HTML web pages such as, for example, preventing malicious client-side scripts in HTML web pages from executing at a client device according to one embodiment. System 100 may include a web/content server 102, server-side security gateway device 104, Internet 106, an optional client-side security gateway device 108, client machine 110 (or client 110) and third-party server 118. Web server 102 is in communication with client 110 via Internet 106. Web server 102 is configured to communicate HTML web pages (hereinafter "web pages") to web browser 112 in response to an HTTP request, e.g., a HTTP GET request from web browser 112. Web pages that are received from web server 102 can include HTML text, CSS data and client-side scripts, e.g., JavaScript instructions (hereinafter "scripts"). While system 100 is described for providing security of HTML web pages, it is to be appreciated that system 100 may also be configured to provide security for other versions of HTML web pages.

In one embodiment, a security gateway device 104 is in communication with web server 102 and Internet 106. Security gateway device 104 may be configured as hardware or as software (or a combination of both) and includes logic to dynamically rewrite web pages that are received at web browser 112. In embodiments, security gateway device 104 may be configured to dynamically rewrite responses in web pages from web server 102 in order to prevent execution of malicious JavaScript instructions or bots that may be inserted in web pages on route to web browser 112, inserted in web pages at web server 102, or that may be inserted during script execution by being referenced from external libraries that contain malicious scripts. Rewriting web pages may include obfuscating node identifier attributes and class name attributes in HTML text, identifying and separating executable code and scripts from HTML text and CSS, removing all externally referenced script libraries, validating the scripts using whitelists and machine learning algorithms, while ensuring that standard headers like content security policy (CSP) are injected into the response, and blocking scripts from executing that contain vulnerable code. In an embodiment, client-side security gateway device 108 may also be provided to be in communication between Internet 106 and client 110. Security gateway device 108 may be configured as a web browser plug-in, a firmware, or a proxy hardware device for intercepting web pages that are communicated between web server 102 and client 110. Third-party server 118 may be in communication with client 110 via Internet 106. Third-party server may be configured to provide open-source JavaScript libraries for use by security gateway devices 104, 108 during code analysis of embedded scripts in HTML web pages. In addition, third-party server 118 may be connected to gateway devices 104, 108 and used to provide code analysis. In an embodiment, gateway device 104, 108 may dynamically rewrite response in web pages based on information or analysis of a web page by third-party server 118. It is to be appreciated that Internet 106 is not limited to a network of interconnected computer networks that use an internet protocol (IP), and can also include other high-speed data networks and/or telecommunications networks that are configured to pass information back and forth to client 110 via security gateway devices 104, 108. Also, while two servers 102 and 118 are shown in the example of system 100, any number of servers are contemplated to be in communication with client 110.

Client 110 may include a desktop computer, a laptop computer, a smart phone, a tablet device or any other type of computing device having a processor and networking capabilities. Client 110 includes a web browser 112 that may be configured to display the contents of rewritten web pages that are received from security gateway devices 104, 108. Web browser 112 may include a HTML execution engine 114 for interpreting and executing the rewritten web pages that are received via security gateway devices 104, 108. A parser 116 communicates with HTML execution engine 114. Parser 116 may be configured to translate the rewritten web pages from security gateway devices 104, 108 into a tree structure of Document Object Model (DOM) element and attribute nodes for display within web browser 112.

Figure 2:
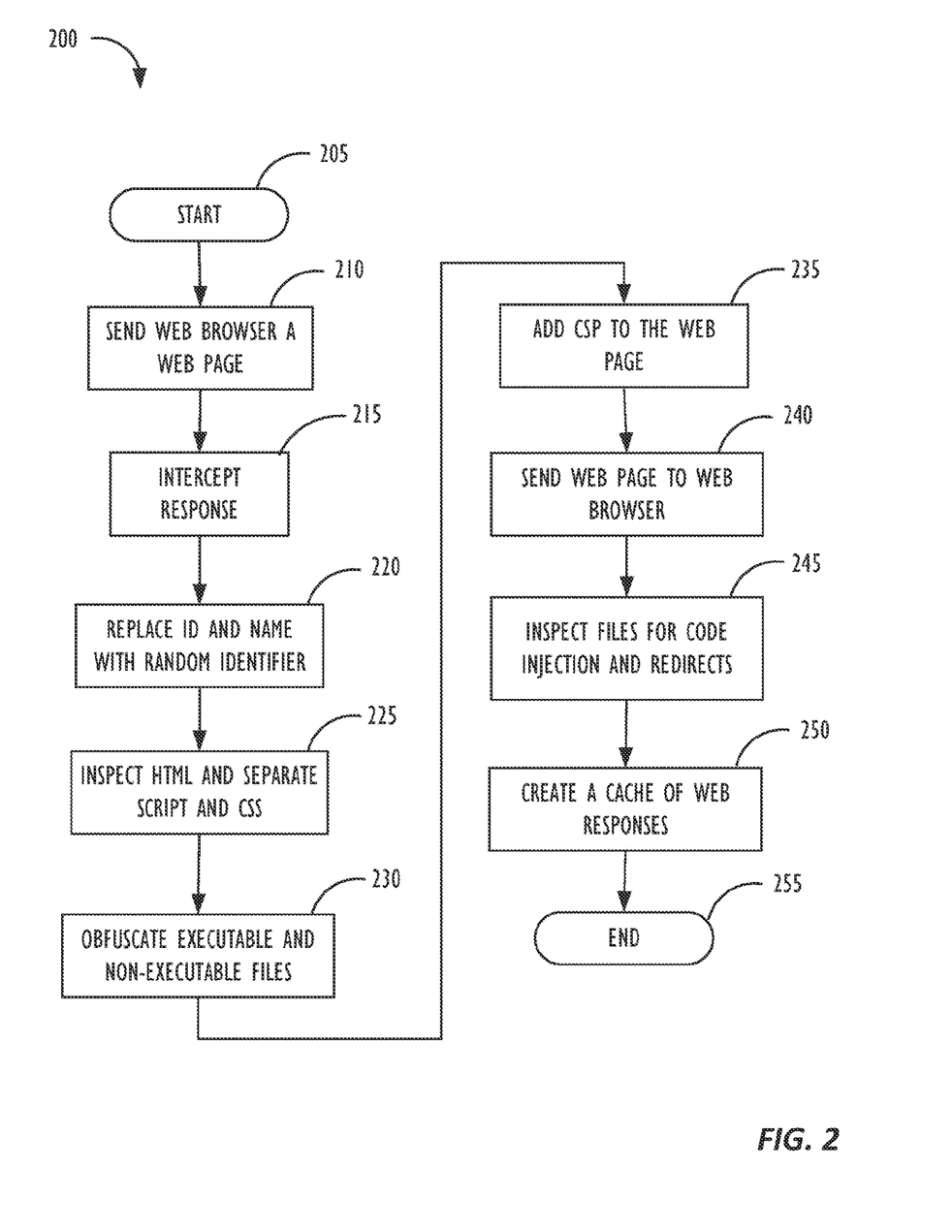
FIG. 2 is a flowchart illustrating a technique for performing security of web pages according to one embodiment.

FIG. 2 is a flowchart illustrating an embodiment of a process 200 that may be performed by system 100 of FIG. 1 for providing HTML security of each web page that is received from web server 102 (FIG. 1). It is to be appreciated that while process 200 is illustrated with security gateway device 104 for clarity of the drawing, the scope of the present invention is not so limited and one or both security gateway devices 104 or 108 may be used to perform the steps of process 200.

Process 200 begins in step 205. In 210, web server 102 may transmit an HTML web page for a web domain to web browser 112 in response to an HTTP GET request.

In 215, the web page may be intercepted by a security gateway appliance, for example, may be intercepted by security gateway device 104 during transmission from web server 102 to web browser 112. The web page may contain dynamic or active content, e.g., inline scripts as well as HTML text and CSS data.

In 220, the web page may be rewritten by replacing node identifiers and name attributes with random identifiers. For example, security gateway device 104 may dynamically obfuscate node identifiers in an HTML input element having a node identifier attribute which receives a text password (e.g., userid in input element <input name="userid" type="text"/>) by replacing the "userid" node identifier with random text (e.g., replace "userid" with "D1" in input element <input name="D1" type="text"/>). As node identifier and name identifier attributes provide a globally unique identifier for an element, replacing these identifier attributes with random text makes it difficult for an attacker bot or malware to identify and change node identifier elements whose value is a password. In an embodiment, a catalog of the obfuscated changes to the web page may be stored in a database for use in translating or recompiling the rewritten web page at web browser 112.

Figure 4A:
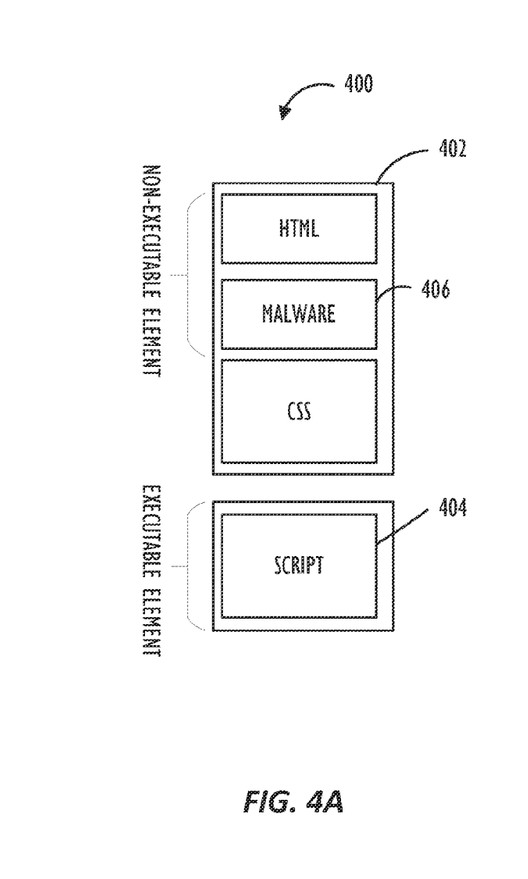
FIG. 4A is a diagram illustrating a technique for separating executable content in a web page with malware according to one embodiment.

In 225, the web page may be inspected and executable code may be separated from style sheets and data. In an embodiment, security gateway device 104 may inspect the web page in order to identify HTML text, CSS style sheet data and scripts. Once identified, scripts may be separated into executable files and HTML text and CSS style sheets may be separated into non-executable files. For example, as depicted in FIG. 4A, security gateway device 104 may separate executable scripts, e.g., JavaScript instructions in web page 400 into a script file 404 that is marked as executable while HTML text and CSS data may be separated into a data file 402 that is marked as non-executable. Thus, any malware or bots 406 that may be present in the HTML text or CSS data are prevented from executing as the non-executable file is marked as non-executable that is not executed when the rewritten web page is received at web browser 112.

In 230, obfuscate the executable and non-executable files. In embodiments, executable code in the script file may be obfuscated further by removing whitespaces and shrinking the size of the script file, keyword substitution or heavily compressed in order to make it difficult for an attacker bot to understand the scrip difficult. In another embodiment, all function and variable names may be renamed in the script file. In embodiments, script code may be mutated by using events and functional blocks, changing function names and modifying code flows, changing data structures and/or changing script patterns such as, for example, replacing object oriented scripts with functional programs using pipelines and chains in order to make it difficult to understand by an attacker bot. In other embodiments, all reference node identifiers and class names may be replaced. For example, security gateway device 104 may inspect non-executable data file 402 (FIG. 4A) and executable script file 404 (FIG. 4A) and may replace all referenced node identifiers and class names with text that is meaningless to an attacker bot. In an embodiment, a catalog of the obfuscated changes to web page may be stored in a database for use in translating or recompiling the rewritten web page at web browser 112.

Figure 4B:
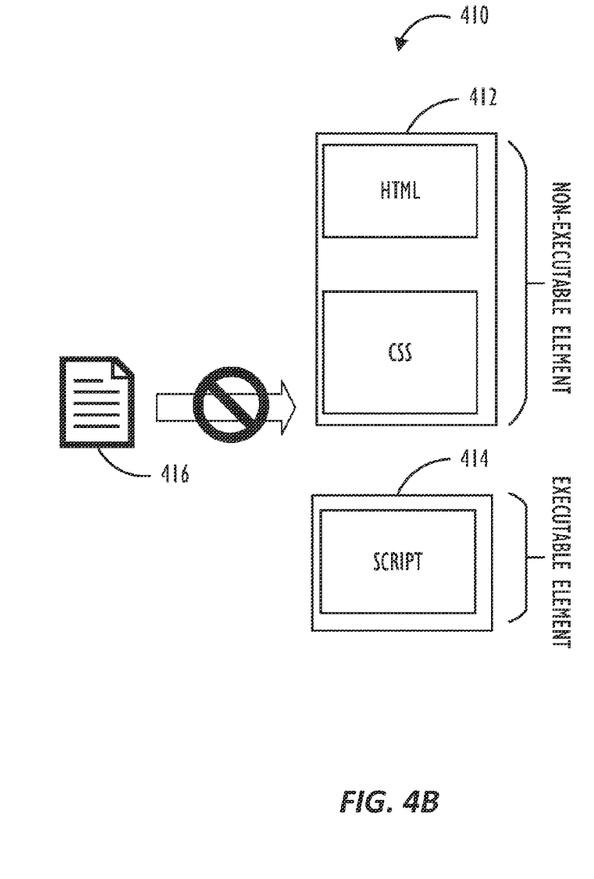
FIG. 4B is a diagram illustrating a technique for separating executable content in a web page with malware according to one embodiment.

In 235, content security policy (CSP) or any other response header related to security and required by HTML standards bodies or supported by browsers may be added to the HTML web page. In an embodiment, CSP may be added to the rewritten web page in order to modify the HTTP header fields that identify or specify the whitelisted sites or domains which the web browser 112 should consider to be valid sources of externally referenced executable scripts. Based on this CSP, web browser 112 may only execute externally referenced scripts that are received from these identified whitelisted domains (e.g., a third-party that hosts JavaScript libraries). In another embodiment, CSP may be configured to identify scripts that may be loaded from external domains that are from the same domain as the web page, ignoring all other scripts (including inline scripts and event-handling HTML attributes). In an example, as shown in FIG. 4B, CSP in an HTML web page 410, with non-executable element 412 and executable element 414, may prevent external script 416 from being injected into executable script element 414 of a web page 410 by web browser 112 if external script 416 is not identified as from the same domain or is not in a whitelisted domain. In this way, adding CSP may prevent injection and subsequent execution of inline script elements that may load other scripts from unknown sources.

In 240, server-side security gateway device 104 may send the rewritten web page including the executable and non-executable elements, a catalog of obfuscated changes to the executable and non-executable elements, and a catalog of disabled code to web browser 112 for use in parsing the webpage and displaying the web page document.

In 245, executable and non-executable files may be inspected by client-side security gateway device 108 for code injections and redirects. In an embodiment, client-side security gateway device 108 may inspect all executable and non-executable files for malicious code injections to unauthorized domains, unknown domains or blacklisted domains. Vulnerable code that is identified may be disabled. In an embodiment, a catalog of disabled code may be stored in a database and/or reported to web server 102. In another embodiment, vulnerable code may be disabled and replaced with trusted code from open-source JavaScript libraries, such as for example, for use by web browser 112.

In 250, a cache of rewritten web page responses may be cached on web server 102 to optimize web responses from web server 102 by reusing rewritten web pages. The process ends in 255.

Figure 3:
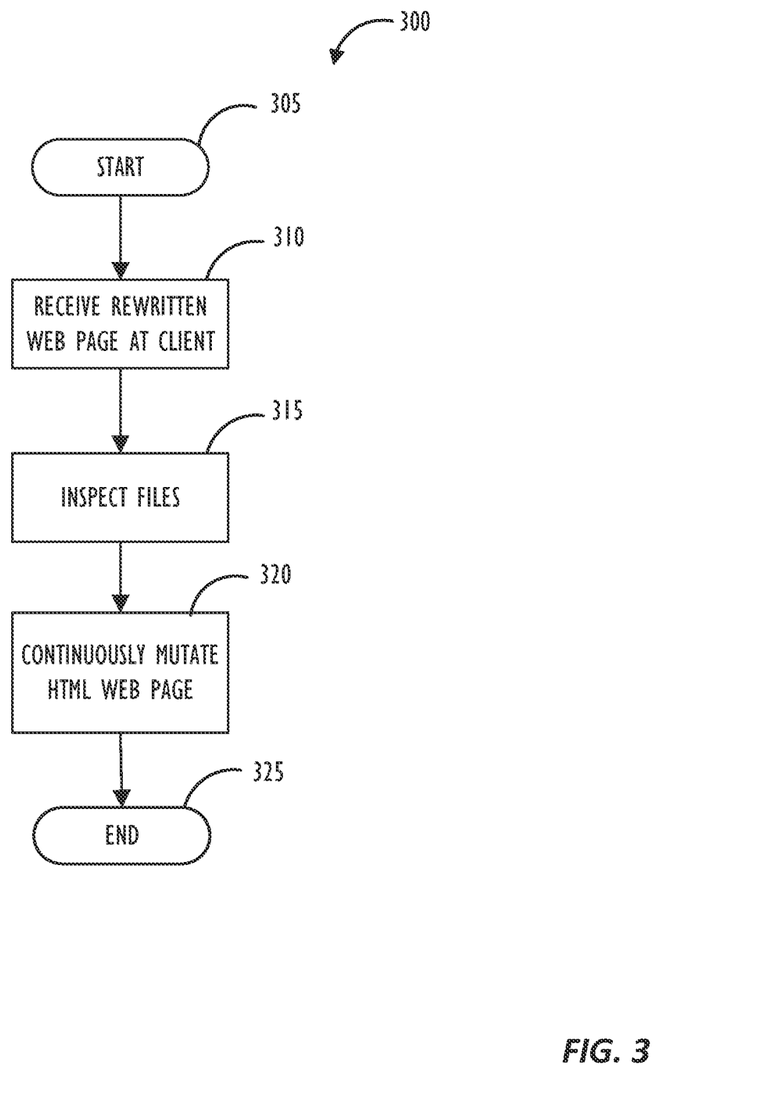
FIG. 3 is a flowchart illustrating a technique for performing security of web pages according to one embodiment.

FIG. 3 is a flowchart illustrating a technique or process 300 that may be performed on a rewritten HTML web page at client 110 of FIG. 1 according to an embodiment. With continued reference to FIG. 1, process 300 begins in step 305. In 310, web browser 112 may receive a rewritten web page from security gateway device 104 via Internet 106. The web page may include the separated executable and non-executable files and obfuscated changes to elements in the executable and non-executable files. In an embodiment, security gateway device 104 may send a catalog of obfuscated changes that were made to the executable and non-executable files and a catalog of disabled code to web browser 112 for use in parsing the webpage and displaying the web page document. In another embodiment, security gateway device 108 may request the catalog of changes from security gateway 104 upon receiving the rewritten web page.

In 315, executable and non-executable files may be inspected for code injections and redirects. In an embodiment, client-side security gateway device 108 may inspect all executable and non-executable files for malicious code injections to unauthorized domains, unknown domains or blacklisted domains. Vulnerable code that is identified may be disabled. In another embodiment, vulnerable code may be disabled and replaced with trusted code from open-source JavaScript libraries, such as for example, for use by web browser 112.

In 320, JavaScript code, HTML and CSS may be periodically mutated at web browser 112. For example, client-side security gateway 108 may mutate JavaScript instructions, HTML text and CSS data using events and timers whenever sending data to a web server 102, for example, in response to a HTTP POST method. The process ends in 325.

Benefits of the embodiments described above include preventing vulnerable code injected in HTML web pages from web domains from executing at a web browser at a client by obfuscating and separating executable content from non-executable content in web pages.

Figure 5:
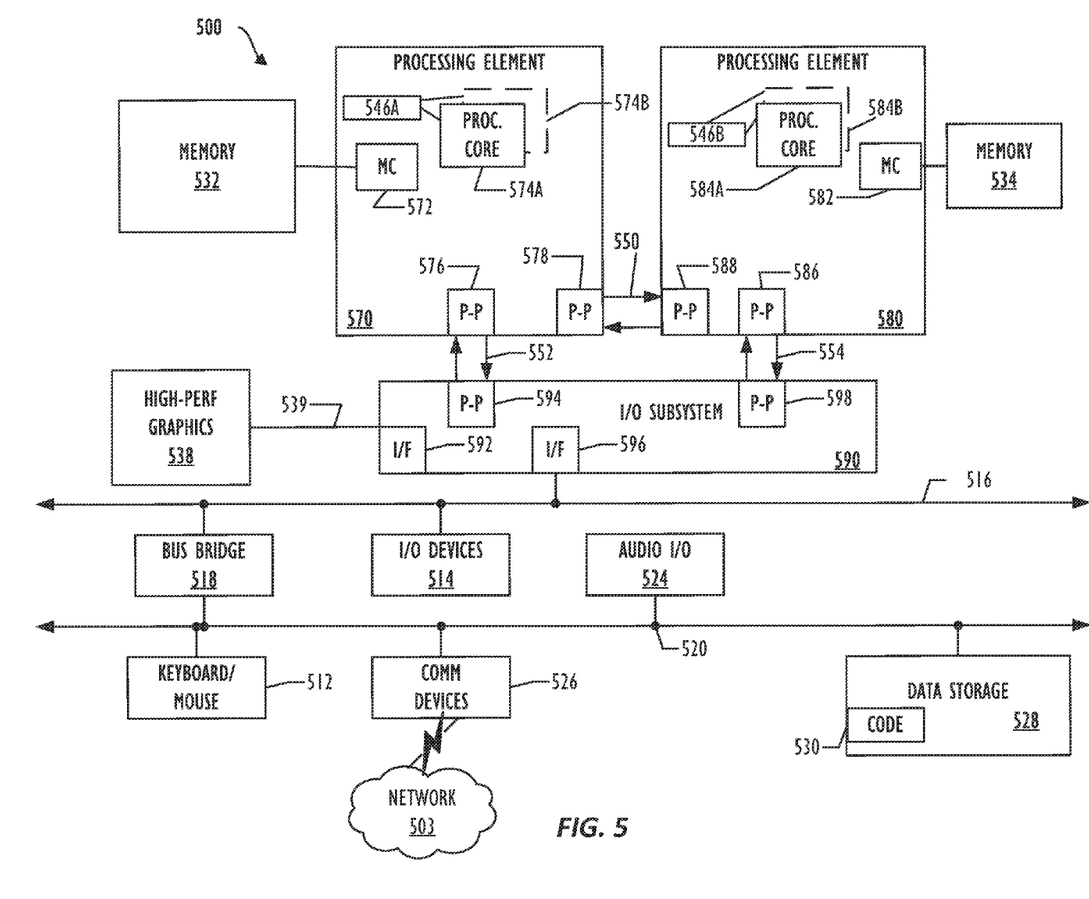
FIG. 5 is a diagram illustrating a computing device for use with techniques described herein according to one embodiment.

Referring now to FIG. 5, a block diagram illustrates a programmable device 500 that may be used within web server 102, security gateway device 104 or client 110 in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 which may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 4, any desired type of link may be used. Also, the elements of FIG. 5 may alternatively be partitioned using more or fewer integrated chips than illustrated in FIG. 5.

Figure 6:
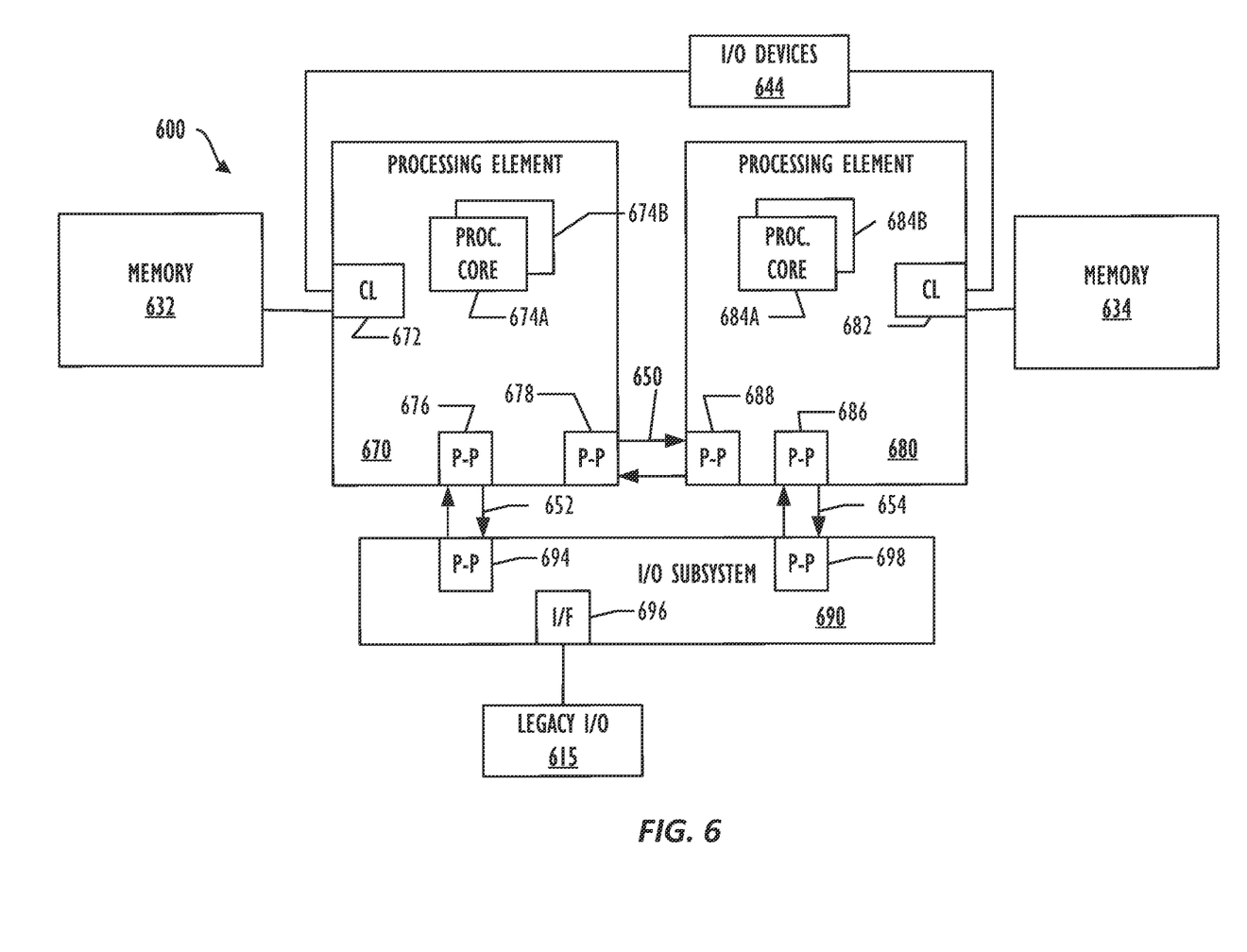
FIG. 6 is a block diagram illustrating a computing device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 5 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
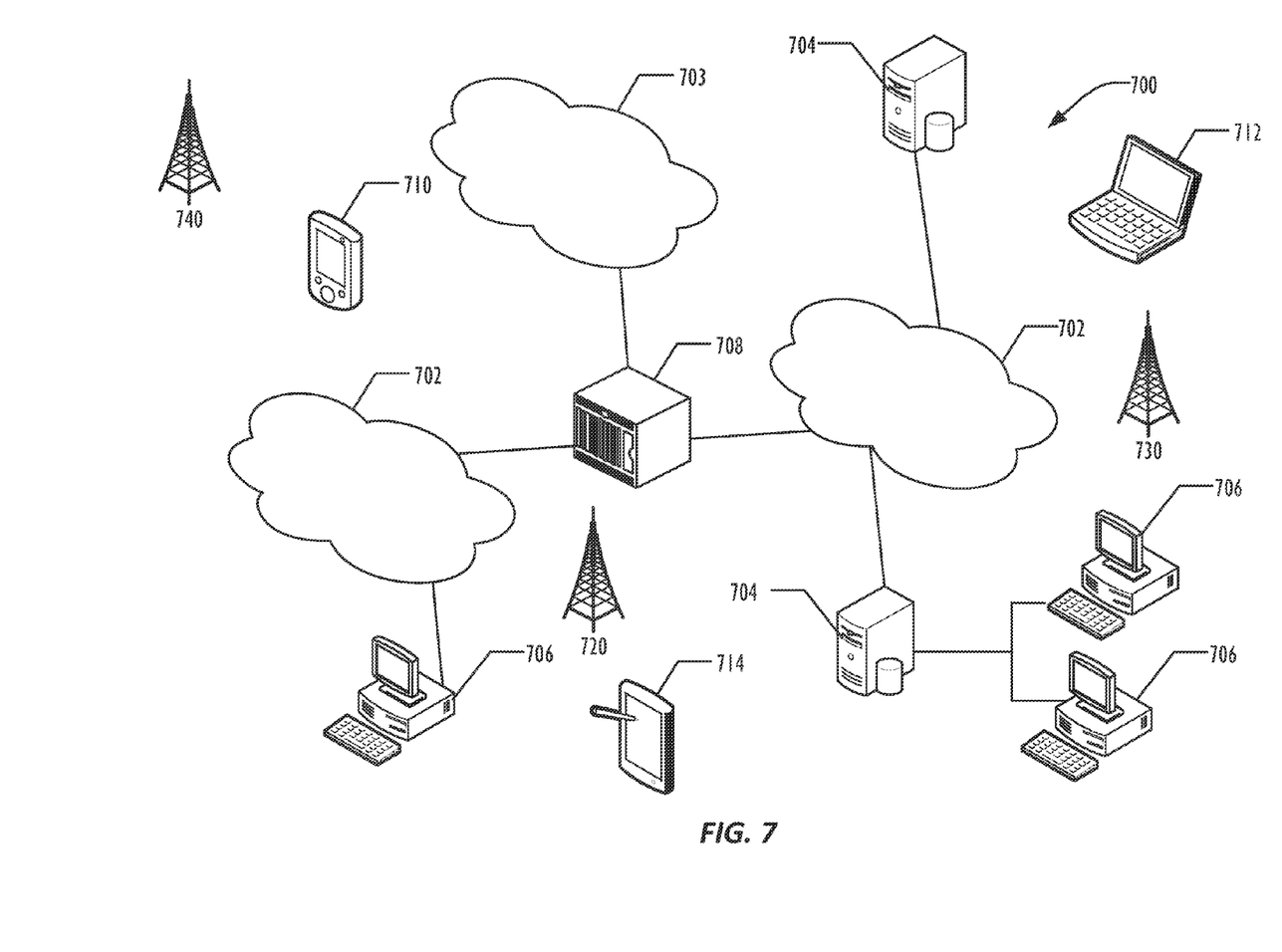
FIG. 7 is a diagram illustrating a network of programmable devices according to one embodiment.

Referring now to FIG. 7, an example infrastructure 700 in which the techniques described above may be implemented is illustrated schematically. Infrastructure 700 contains computer networks 702. Computer networks 702 may include many different types of computer networks available today, such as the Internet, a corporate network or a Local Area Network (LAN). Each of these networks can contain wired or wireless programmable devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of mobile devices. Mobile devices in the infrastructure 700 are illustrated as mobile phones 710, laptops 712 and tablets 714. A mobile device such as mobile phone 710 may interact with one or more mobile provider networks as the mobile device moves, typically interacting with a plurality of mobile network towers 720, 730, and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712 and 714 may interact with non-mobile devices such as computers 704 and 706 for desired services, which may include providing the application, script, or web content in web pages to a web browser at a client described above. The functionality of the gateway device 104 or client 110 may be implemented in any device or combination of devices illustrated in FIG. 7; however, most commonly is implemented in a firewall or intrusion protection system in a gateway or router.

The following examples pertain to further embodiments.

Example 1 is a machine readable medium, on which are stored instructions, comprising instructions that when executed cause a machine to: intercept a web page during transmission over a network; and separate executable content from non-executable content in the web page; wherein the executable content includes client-side instructions and the non-executable content includes hypertext markup text and style sheets.

In Example 2, the subject matter of Example 1 can optionally include, wherein the instructions further comprise instructions that when executed cause the machine to obfuscate content in the web page, producing obfuscated content.

In Example 3, the subject matter of Example 2 can optionally include, wherein the obfuscated content comprises executable obfuscated content and non-executable obfuscated content.

In Example 4, the subject matter of Example 2 can optionally include, wherein the instructions that when executed cause the machine to obfuscate content further comprise instructions that when executed cause the machine to replace node identifiers and name attributes with random text in the content.

In Example 5, the subject matter of Example 2 can optionally include, wherein the instructions that when executed cause the machine to obfuscate content further comprise instructions that when executed cause the machine to perform one or more of remove whitespaces in the executable content, rename function names and variable names in the executable content, and substitute keywords in the executable content.

In Example 6, the subject matter of Example 1 to 5 can optionally include, wherein the instructions further comprise instructions that when executed cause the machine to add content security policy to the web page.

In Example 7, the subject matter of Example 6 can optionally include, wherein the instructions that when executed cause the machine to add content security policy to the web page further comprise instructions that when executed cause the machine to identify whitelisted domains for script libraries.

In Example 8, the subject matter of Example 1 to 2 can optionally include, wherein the instructions that when executed cause the machine to separate executable content from non-executable content in the web page further comprise instructions that when executed cause the machine to identify the hypertext markup text and style sheets as non-executable elements.

In Example 9, the subject matter of Example 1 to 2 can optionally include, wherein the instructions further comprise instructions that when executed cause the machine to analyze information in the web page or receive analysis information on the web page from a remote server.

Example 10 is a method for web page security, comprising: intercepting a web page during transmission over a network; and separating executable content from non-executable content in the web page; wherein the executable content includes client-side instructions and the non-executable content includes hypertext markup text and style sheets.

In Example 11, the subject matter of Example 10 can optionally include obfuscating content in the web page, producing obfuscated content.

In Example 12, the subject matter of Example 10 can optionally include, wherein the obfuscated content comprises executable obfuscated content and non-executable obfuscated content.

In Example 13, the subject matter of Example 10 can optionally include replacing node identifiers and name attributes with random text in the content.

In Example 14, the subject matter of Example 10 to 11 can optionally include performing one or more of removing whitespaces in the executable content, renaming function names and variable names in the executable content, and substituting keywords in the executable content.

In Example 15, the subject matter of Example 10 to 11 can optionally include adding content security policy to the web page.

In Example 16, the subject matter of Example 10 to 15 can optionally include identifying whitelisted domains for script libraries.

In Example 17, the subject matter of Example 10 to 11 can optionally include analyzing information in the web page or receiving analysis information on the web page from a remote server.

Example 18 is a computer system for web page security, comprising: one or more processors; and a memory coupled to the one or more processors, on which are stored instructions, comprising instructions that when executed cause one or more of the processors to: intercept a web page during transmission over a network; and separate executable content from non-executable content in the web page; wherein the executable content includes client-side instructions and the non-executable content includes hypertext markup text and style sheets.

In Example 19, the subject matter of Example 18 can optionally include, wherein the instructions further comprise instructions that when executed cause the one or more processors to obfuscate content in the web page, producing obfuscated content.

In Example 20, the subject matter of Example 19 can optionally include, wherein the obfuscated content comprises executable obfuscated content and non-executable obfuscated content.

In Example 21, the subject matter of Example 19 can optionally include, wherein the instructions further comprise instructions that when executed cause the one or more processors to replace node identifiers and name attributes with random text in the content.

In Example 22, the subject matter of Example 18 to 19 can optionally include, wherein the instructions further comprise instructions that when executed cause the one or more processors to perform one or more of remove whitespaces in the executable content, rename function names and variable names in the executable content, and substitute keywords in the executable content.

In Example 23, the subject matter of Example 18 to 19 can optionally include, wherein the instructions further comprise instructions that when executed cause the one or more processors to add content security policy to the web page.

In Example 24, the subject matter of Example 22 can optionally include, wherein the instructions further comprise instructions that when executed cause the one or more processors to identify whitelisted domains for script libraries.

In Example 25, the subject matter of Example 18 to 19 can optionally include, wherein the instructions further comprise instructions that when executed cause the one or more processors to identify the hypertext markup text and style sheets as non-executable elements.

In Example 26, the subject matter of Example 18 to 19 can optionally include, wherein the instructions further comprise instructions that when executed cause the machine to analyze information in the web page or receive analysis information on the web page from a remote server.

Example 27 is a computer system for web page security, comprising: one or more processors; and a memory coupled to the one or more processors, on which are stored instructions, comprising instructions that when executed cause one or more of the processors to: transmit a request for a web page; receive a rewritten web page responsive to transmitting of the request; inspect the rewritten web page for vulnerable content; and parse the rewritten web page for display on a web browser; wherein the rewritten web page includes executable content that is separated from non-executable content.

In Example 28, the subject matter of Example 27 can optionally include, wherein the computer system is a client-side gateway device.

In Example 29, the subject matter of Example 27 to 28 can optionally include, wherein the rewritten web page includes obfuscated content.

In Example 30, the subject matter of Example 27 to 28 can optionally include, wherein the instructions further comprise instructions that when executed cause the one or more processors to inspect the rewritten web page for code injections and redirects to unauthorized domains.

In Example 31, the subject matter of Example 30 can optionally include, wherein the instructions further comprise instructions that when executed cause the one or more processors to replace the unauthorized domains with whitelisted domains.

In Example 32, the subject matter of Example 27 to 28 can optionally include, wherein the instructions further comprise instructions that when executed cause the one or more processors to analyze information in the web page or receive analysis information on the web page from a remote server.

Example 33 is a method for web page security, comprising: transmitting a request for a web page; receiving a rewritten web page responsive to transmitting of the request; inspecting the rewritten web page for vulnerable content; and parsing the rewritten web page for display on a web browser; wherein the rewritten web page includes executable content that is separated from non-executable content.

In Example 34, the subject matter of Example 33 can optionally include, wherein the computer system is a client-side gateway device.

In Example 35, the subject matter of Example 33 to 34 can optionally include, wherein the rewritten web page includes obfuscated content.

In Example 36, the subject matter of Example 33 to 34 can optionally include inspecting the rewritten web page for code injections and redirects to unauthorized domains.

In Example 37, the subject matter of Example 36 can optionally include replacing the unauthorized domains with whitelisted domains.

In Example 38, the subject matter of Example 33 to 34 can optionally include analyzing information in the web page or receiving analysis information on the web page from a remote server.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a machine to:
   intercept a web page during transmission over a network;
   split the web page into a first content file that is marked executable and a second content file that is marked non-executable; and
   send the first content file and the second content file to a web browser,
   wherein the first content file includes client-side instructions and the second content file includes hypertext markup text and style sheets.

2. The non-transitory machine readable medium of claim 1, wherein the instructions stored on the machine readable medium further comprise instructions that when executed cause the machine to obfuscate the first content file and the second content file.

3. The non-transitory machine readable medium of claim 2, wherein the obfuscated first content file comprises executable obfuscated content and the obfuscated second content file comprises non-executable obfuscated content.

4. The non-transitory machine readable medium of claim 3, wherein the instructions stored on the machine readable medium that when executed cause the machine to obfuscate the first content file and the second content file further comprise instructions that when executed cause the machine to perform one or more of:
   remove whitespaces in the executable obfuscated content,
   rename function names and variable names in the executable obfuscated content, and
   substitute keywords in the executable obfuscated content.

5. The non-transitory machine readable medium of claim 2, wherein the instructions stored on the machine readable medium that when executed cause the machine to obfuscate the first content file and the second content file further comprise instructions that when executed cause the machine to replace node identifiers and name attributes with random text.

6. The non-transitory machine readable medium of claim 1, wherein the instructions stored on the machine readable medium further comprise instructions that when executed cause the machine to add content security policy to the web page.

7. The non-transitory machine readable medium of claim 6, wherein the instructions stored on the machine readable medium that when executed cause the machine to add content security policy to the web page further comprise instructions that when executed cause the machine to identify whitelisted domains for script libraries.

8. The non-transitory machine readable medium of claim 1, wherein the instructions stored on the machine readable medium that when executed cause the machine to split the web page into a first content file that is marked executable and a second content file that is marked non-executable further comprise instructions that when executed cause the machine to identify the hypertext markup text and style sheets as non-executable content.

9. A computer system for web page security, comprising:
   one or more processors; and
   a memory coupled to the one or more processors, on which are stored instructions, comprising instructions that when executed cause one or more of the processors to:

intercept a web page during transmission over a network;

split the web page into a first content file that is marked executable and a second content file that is marked non-executable; and send the first content file and the second content file to a web browser, wherein the first content file includes client-side instructions and the second content file includes hypertext markup text and style sheets.

10. The computer system of claim 9, wherein the instructions stored on the memory further comprise instructions that when executed cause the one or more processors to obfuscate the first content file and the second content file.

11. The computer system of claim 10, wherein the obfuscated first content file comprises executable obfuscated content and the obfuscated second content file comprises non-executable obfuscated content.

12. The computer system of claim 10, wherein the instructions stored on the memory that when executed cause the one or more processors to obfuscate the first content file and the second content file further comprise instructions that when executed cause the one or more processors to replace node identifiers and name attributes with random text.

13. The computer system of claim 9, wherein the instructions stored on the memory that when executed cause the one or more processors to obfuscate the first content file and the second content file further comprise instructions that when executed cause the one or more processors to perform one or more of:

remove whitespaces in the first content file, rename function names and variable names in the first content file, and substitute keywords in the first content file.

14. The computer system of claim 9, wherein the instructions stored on the memory further comprise instructions that when executed cause the one or more processors to add content security policy to the web page.

15. The computer system of claim 14, wherein the instructions stored on the memory that when executed cause the one or more processors to add content security policy to the web page further comprise instructions that when executed cause the one or more processors to identify whitelisted domains for script libraries.

16. The computer system of claim 9, wherein the instructions stored on the memory that when executed cause the one or more processors to split the web page into a first content file that is marked executable and a second content file that is marked non-executable further comprise instructions that when executed cause the one or more processors to identify the hypertext markup text and style sheets as non-executable content.

17. A computer system for web page security, comprising:

one or more processors; and a memory coupled to the one or more processors, on which are stored instructions, comprising instructions that when executed cause one or more of the processors to:

transmit a request for a web page;

receive a rewritten web page in response to transmitting the request, wherein the rewritten web page includes a first content file that is marked executable and a second content file that is marked non-executable, wherein the first content file includes client-side instructions and the second content file includes hypertext markup text and style sheets, and wherein the first content file and the second content file are split from the web page;

inspect the rewritten web page for vulnerable content; and parse the rewritten web page for display on a web browser.

18. The computer system of claim 17, wherein the computer system is a client-side gateway device.

19. The computer system of claim 17, wherein each of the first content file and the second content file includes obfuscated content.

20. The computer system of claim 17, wherein the instructions stored on the memory further comprise instructions that when executed cause the one or more processors to inspect the rewritten web page for code injections and redirects to unauthorized domains.

21. The computer system of claim 20, wherein the instructions stored on the memory further comprise instructions that when executed cause the one or more processors to replace the unauthorized domains with whitelisted domains.

22. A method for web page security, comprising:

intercepting a web page during transmission over a network;

splitting the web page into a first content file that is marked executable and a second content file that is marked non-executable; and send the first content file and the second content file to a web browser, wherein the first content file includes client-side instructions and the second content file includes hypertext markup text and style sheets.

23. The method of claim 22, further comprising obfuscating the first content file and the second content file.

24. The method of claim 23, wherein the obfuscated first content file comprises executable obfuscated content and the obfuscated second content file comprises non-executable obfuscated content.

25. The method of claim 23, wherein obfuscating the first content file and the second content file comprises replacing node identifiers and name attributes with random text.

* * * * *